(12) United States Patent
Little

(10) Patent No.: US 6,536,179 B2
(45) Date of Patent: Mar. 25, 2003

(54) BLOCKING ANCHOR FOR ATTACHMENT OF A BRIDGE BETWEEN ADJACENT FLOOR JOISTS

(76) Inventor: John M. Little, 37 Evergreen Landing S.W., Calgary, Alberta (CA), T2Y 3J8

( * ) Notice: Subject to any disclaimer, the term of this patent is extended or adjusted under 35 U.S.C. 154(b) by 113 days.

(21) Appl. No.: 09/784,262

(22) Filed: Feb. 16, 2001

(65) Prior Publication Data

US 2002/0112438 A1 Aug. 22, 2002

(51) Int. Cl.[7] ............................................. F16B 5/00
(52) U.S. Cl. ............................... 52/702; 52/712; 52/715; 52/656.9; 52/650.3; 403/230
(58) Field of Search ......................... 52/702, 703, 712, 52/714, 715, 656.9, 650.3; 403/230, 232.1

(56) References Cited

U.S. PATENT DOCUMENTS

| | | | | |
|---|---|---|---|---|
| 3,537,221 A | * | 11/1970 | Helfman | |
| 3,601,428 A | * | 8/1971 | Gilb | |
| 3,989,398 A | * | 11/1976 | Wendt | 403/232 |
| 4,411,548 A | * | 10/1983 | Tschan | |
| 4,480,941 A | * | 11/1984 | Gilb et al. | |
| 4,481,690 A | * | 11/1984 | Simmons | |
| 4,964,253 A | * | 10/1990 | Loeffler | |
| 5,071,284 A | * | 12/1991 | Turner | |
| 5,111,632 A | * | 5/1992 | Turner | |
| 5,186,571 A | * | 2/1993 | Hentzschel | 403/231 |
| 5,457,928 A | * | 10/1995 | Sahnazarian | 52/702 |
| 5,836,131 A | * | 11/1998 | Viola et al. | 52/702 |
| 6,230,467 B1 | * | 5/2001 | Leek | 52/702 |

* cited by examiner

Primary Examiner—Carl D. Friedman
Assistant Examiner—Jennifer I. Thissell
(74) Attorney, Agent, or Firm—David S. Thompson

(57) ABSTRACT

A blocking anchor (20) allows connection of each end of an engineered or dimensional lumber bridge between first and second parallel joists. Each blocking anchor includes a saddle (22), which cradles the end of the bridge, and a pair of fastening flanges, which allow attachment to the side of the joist. The saddle is formed by a base (30), from which first and second legs (40), (50) extend. The saddle is sized to fit over the end of dimensional lumber or engineered beams. The first and second fastening flanges (60), (70) extend from opposed sides of the base, perpendicular to the legs. Fastener holes defined in each leg and in the fastening flanges allow the use of screws, possibly nails, or other fasteners to attach the legs to the bridge and the fastening flanges to the joist.

6 Claims, 5 Drawing Sheets

BLOCKING ANCHOR FOR ATTACHMENT OF A BRIDGE BETWEEN ADJACENT FLOOR JOISTS

CROSS-REFERENCES

There are no applications related to this application filed in this or any foreign country.

BACKGROUND

Floor joists may be constructed of dimensional lumber or engineered wood. Engineered wood beams are made from upper and lower flanges made of dimensional or composite lumber, and a vertical I-beam webbing made of manufactured material, typically made from pressed wood chips.

A matrix of floor joists may be strengthened by bridging or blocking techniques. In addition to extending the distance over which floor joists may span, and the weight they may support, bridges reduce the vibration (such as floor squeaking) that may result in lower quality construction. Blocking involves the use of a short segment oriented perpendicularly to two adjacent floor joists. Such segments are often known as a bridge or a block. In a typical application, the bridge is made of the same material as the floor joists. For example, where a 10" manufactured I-beam is used as a floor joist, the bridge is also a 10" manufactured I-beam.

First and second ends of the bridge are connected to first and second adjacent floor joists. The manner of connection, between the first and second ends of the bridge and the first and second adjacent typically involves the use of nails. Such nails are "toe nailed," that is, the nail passes through the bridge at an approximately 45 degree angle, and terminates in the floor joist.

Use of toe nailed fasteners to make the connection is undesirable for a number reasons. First, the connection between the nail and the bridge is weak, since only the corner of the bridge is in contact with the nail. Thus, the bridge is weakened in the area about the fastener, and is therefore prone to breaking. Further, the connection with the floor joist is weak, since only a portion of the nail or other fastener passes into the joist, since some of the length of the fastener is enclose within the bridge.

An additional failing of this connection is that it fails to adequately compensate for slight. errors in the length of the bridge. For example, where the bridge is slightly shorter then the distance between two parallel floor joists, the construction worker may attempt to overcome this by allowing the nails used in the toe nailing process to span between the bridge and the floor joist. Such construction techniques are undesirable, and contribute to weakened construction.

For the foregoing reasons, there is a need for an improved apparatus and method of use that can better connect the first and second ends of a bridge to adjacent floor joists. The apparatus must result in a better and stronger connection, must be adapted for use with floor joists made of both engineered wood products and dimensional lumber, must be adapted for use with bridges made of both engineered wood products and dimensional lumber, and must be capable of compensating for bridges that are incrementally shorter than the distance between two floor joists.

SUMMARY

The present invention is directed to an apparatus that satisfies the above needs. A novel blocking anchor is disclosed that can better connect the first and second ends of a bridge to adjacent floor joists, resulting in a better and stronger connection, is adapted for use with floor joists made of both engineered wood products and dimensional lumber, is adapted for use with bridges made of both engineered wood products and dimensional lumber, and is capable of compensating for bridges that are incrementally shorter than the distance between two floor joists.

The blocking anchor 20 for attachment of a bridge between adjacent floor joists of the present invention provides some or all of the following structures.

(A) A base 30 is made of sheet material, having dimensions equal to the cross-sectional area of the flange of an engineered bridge.

(B) First and second legs 40, 50 extend from opposed sides of the base, each having a height equal to the height of the flange of the bridge. Two fastener holes defined in the first leg are staggered with respect to two fastener holes defined in the second leg. Four fasteners, preferably screws, but possibly nails, may be used to fasten the first and second legs to opposed sides of the flange of an engineered bridge or a dimensional bridge.

(C) First and second fastening flanges 60, 70 extend from opposed sides of the base. In a preferred embodiment, the first and second fastening flanges are formed from associated punch-outs defined in the first and second legs, respectively. Each fastening flange defines a hole for passage of a fastener, which allows attachment of the blocking anchor to the flange of an engineered joist, or the side of a dimensional lumber joist.

(D) As seen in the plan view of FIG. 4, a plurality of bridge elements are staggered between a plurality of joists. By staggering the bridge elements, the fasteners extending from the fastening flanges enter the joists in a staggered manner that does not result in conflict between the fasteners associated with bridges on opposed sides of a joist.

It is therefore a primary advantage of the present invention to provide a novel blocking anchor for attachment of a bridge between adjacent floor joists, which provides a better connection between the first and second ends of a bridge and adjacent floor joists, resulting in a better and stronger, construction.

Another advantage of the present invention is to provide a novel blocking anchor for attachment of a bridge between adjacent floor joists, which is adapted for use with floor joists made of both engineered wood products and dimensional lumber, and which is adapted for use with bridges made of both engineered wood products and dimensional lumber.

A still further advantage of the present invention is to provide a novel blocking anchor for attachment of a bridge between adjacent floor joists, which is capable of compensating for bridges that are incrementally shorter than the distance between two floor joists.

Other objectives, advantages and novel features of the invention will become apparent to those skilled in the art upon examination of the specification and the accompanying drawings.

DRAWINGS

These and other features, aspects, and advantages of the present invention will become better understood with regard to the following description, appended claims, and accompanying drawings where:

DESCRIPTION

Figure 1:
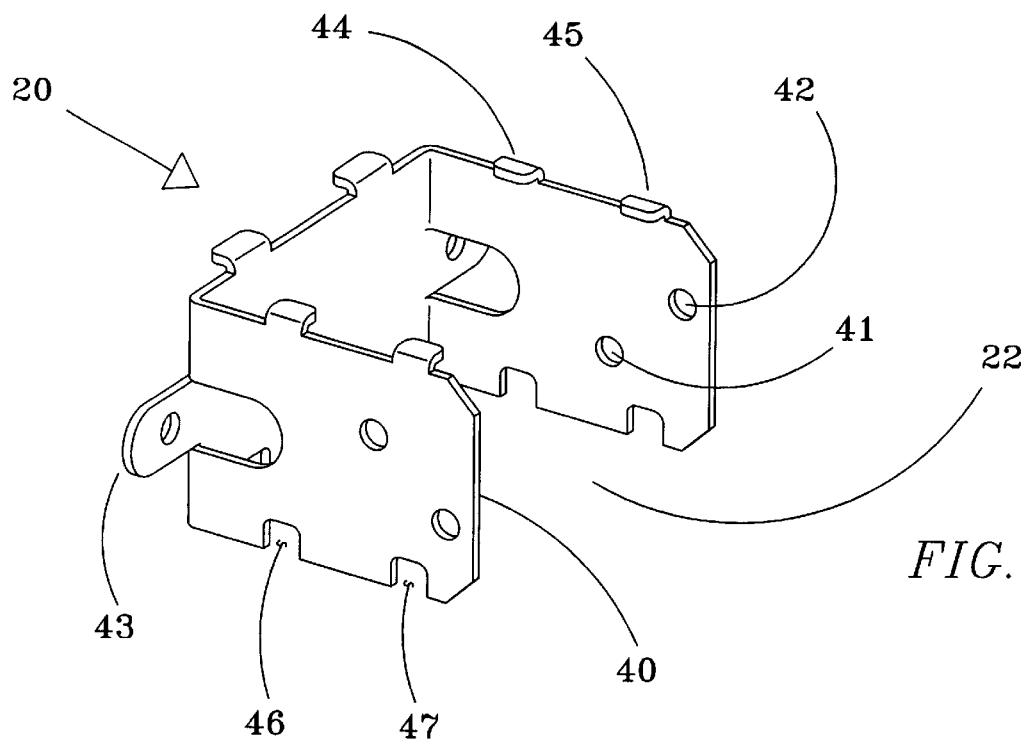
FIG. 1 is an orthographic view from the rear, of a version of the blocking anchor of the invention.
Figure 2:
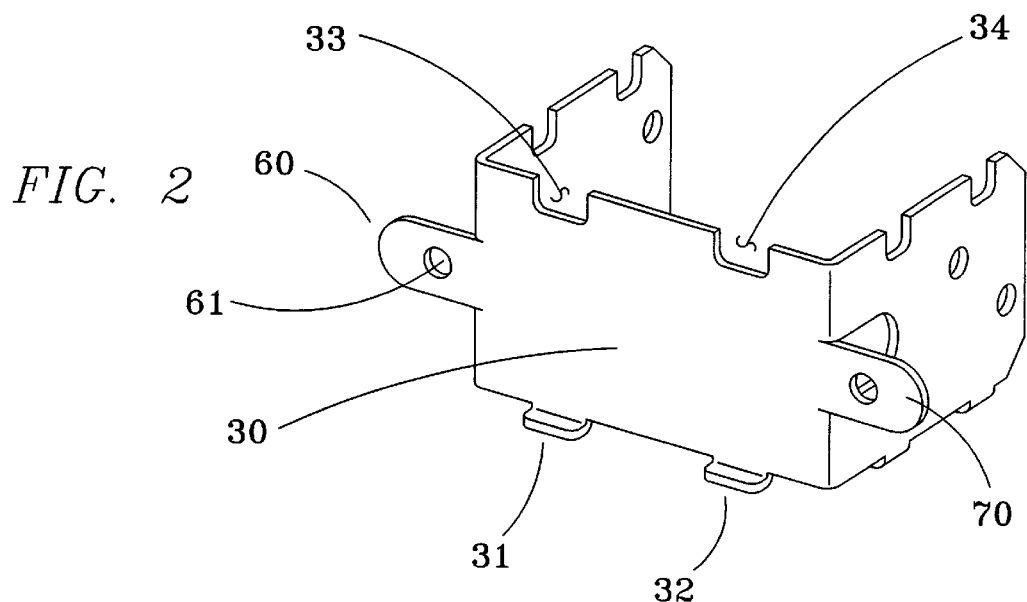
FIG. 2 is an orthographic view from the front, of a version of the blocking anchor of the invention.
Figure 3:
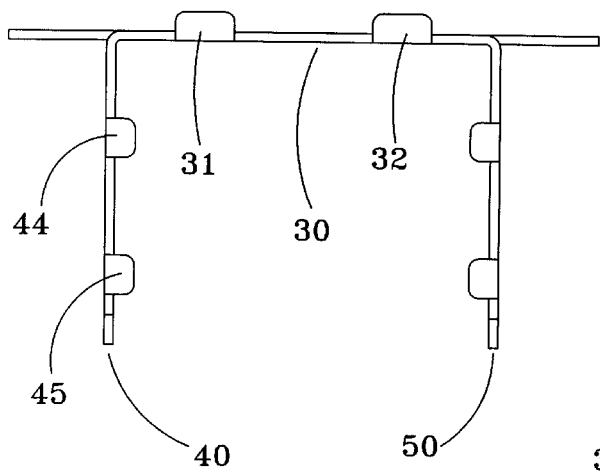
FIG. 3 is an isometric view of the blocking anchor from the top.
Figure 4:
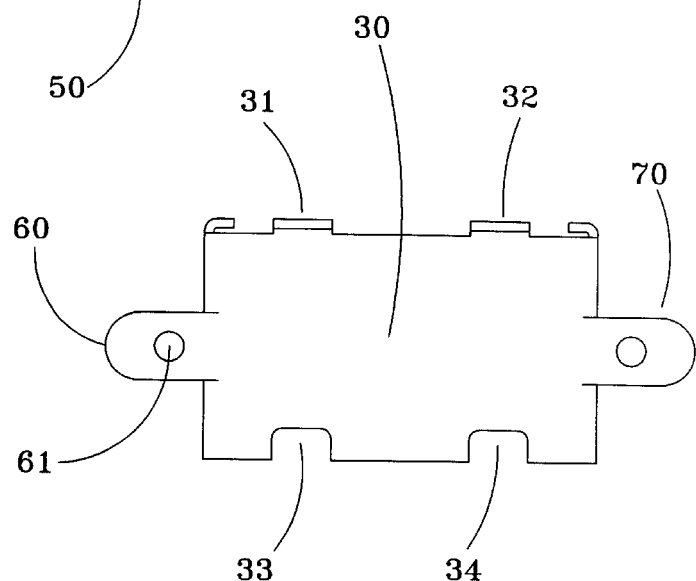
FIG. 4 is an isometric view of the blocking anchor from the front.
Figure 5:
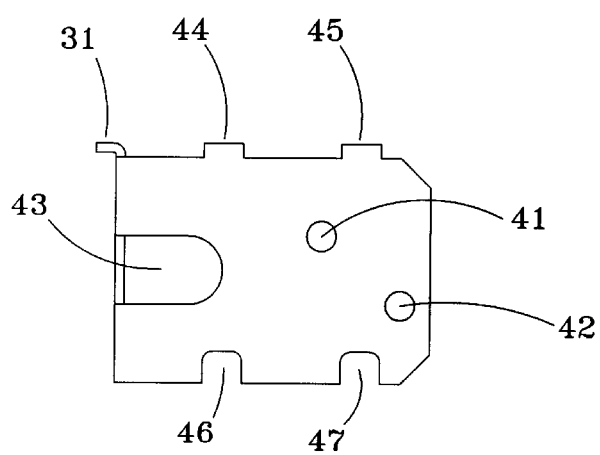
FIG. 5 is an isometric view of the blocking anchor from the side.

Referring in generally to FIGS. 1 and 2, a blocking anchor 20 constructed in accordance with the principles of the invention is seen. The blocking anchor allows connection of each end of an engineered or dimensional lumber bridge between first and second parallel joists. In a typical application, an upper and lower blocking anchor are used to attach the bridge to the joist. Each blocking anchor includes a saddle 22, which cradles the end of the bridge, and a pair of fastening flanges, which allow attachment to the side of the joist. The saddle is sized to fit over the end of dimensional lumber or engineered beams. The saddle 22 is formed by a base 30, from which first and second legs 40, 50 extend. The first and second fastening flanges 60, 70 extend from opposed sides of the base, and are oriented perpendicularly to the legs. Fastener holes defined in each leg and in the fastening flanges allow the use of screws, in some cases nails, or other fasteners to attach the legs to the bridge and the fastening flanges to the joist.

In a preferred embodiment, the blocking anchor is made of sheet metal. In some applications, the sheet metal is zinc coated, to result in superior weather resistance. Sheet metal provides the best relationship of manufacturing cost and product strength, reliability and overall quality. However, in alternative embodiments, plastic, resin or other material could be substituted.

Referring to FIGS. 1–5, a preferred version of the blocking anchor 20 is seen. A saddle 22 is formed from a base 30, from which extend first and second legs 40, 50. A preferred base 30 is made of a planar material having dimensions equal to the cross-sectional area of the flange or rail 201, 202 of an engineered bridge 200. As a result, the base separates the legs by a distance incrementally greater than the width of the rail of the engineered bridge 200 or the width of the dimensional bridge 400.

Referring particularly to FIGS. 1 and 2, the structure of left and right tabs 31, 32 extending perpendicularly from the base may be seen. The utility of the tabs. may be seen with reference to FIG. 6, wherein upper and lower blocking anchors are used to attach an engineered bridge to an engineered joist. The tabs of the upper blocking anchor wrap over the upper surface 104 of the upper rail 101 of the engineered joist 100. The tabs of the lower blocking anchor wrap over the lower surface of the lower rail 102 of the engineered joist. A web 103 spans between the upper and lower rails, and is not directly attached to the blocking anchor.

Figure 7:
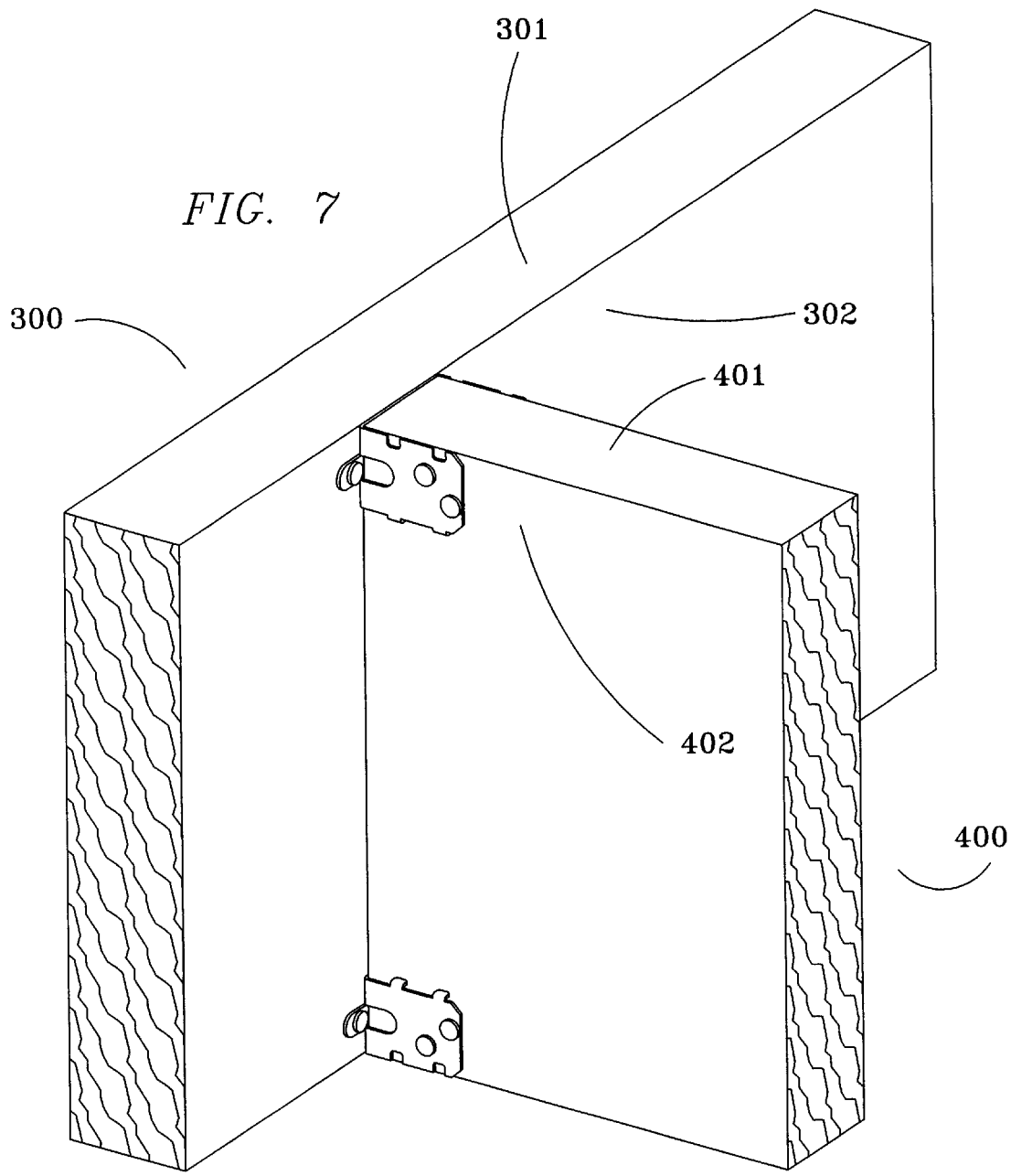
FIG. 7 is an orthographic view of two blocking anchors fastening a dimensional lumber bridge to a dimensional lumber joist.

Referring to FIG. 7, similar upper and lower blocking anchors are seen attaching a dimensional lumber bridge 400 to a dimensional lumber joist 300. The tabs extending from the base of the upper blocking anchor wrap over the upper surface 301 of the dimensional lumber joist 300. The tabs extending from the base of the lower blocking anchor wrap over the lower surface of the dimensional lumber joist.

In a preferred version of the base, left and right notches 33, 34 result during the manufacturing process, wherein sheet metal used to form the blocking anchors is stamped to form each blocking anchor. The notches defined in the base in a first blocking anchor, therefore, correspond to the tabs extending from the base in a second blocking anchor formed from sheet metal material adjacent to the first.

First and second legs 40, 50 extend from opposed sides of the base, each having a height equal to the height of the rail or flange 201, 202 of the engineered bridge 200. Fastening the legs of upper and lower blocking anchors to opposed sides of the upper and lower rails provides a secure connection between the blocking anchors 20 and the bridge. The webbing 203, carried between the upper and lower rails, is not directly connected to the blocking anchor. Where a dimensional lumber bridge 400 is used, the upper and lower blocking anchors are attached to upper and lower positions on the bridge, as seen in FIG. 7.

Referring particularly to FIGS. 1 and 2, first and second fastener holes 41, 42 are defined in the first leg 40. Similar fastener holes are defined in the second leg 50, and are staggered with respect to two fastener holes defined in the first leg. By staggering the fastener holes, it is not possible for two fasteners to come into contact.

Figure 6:
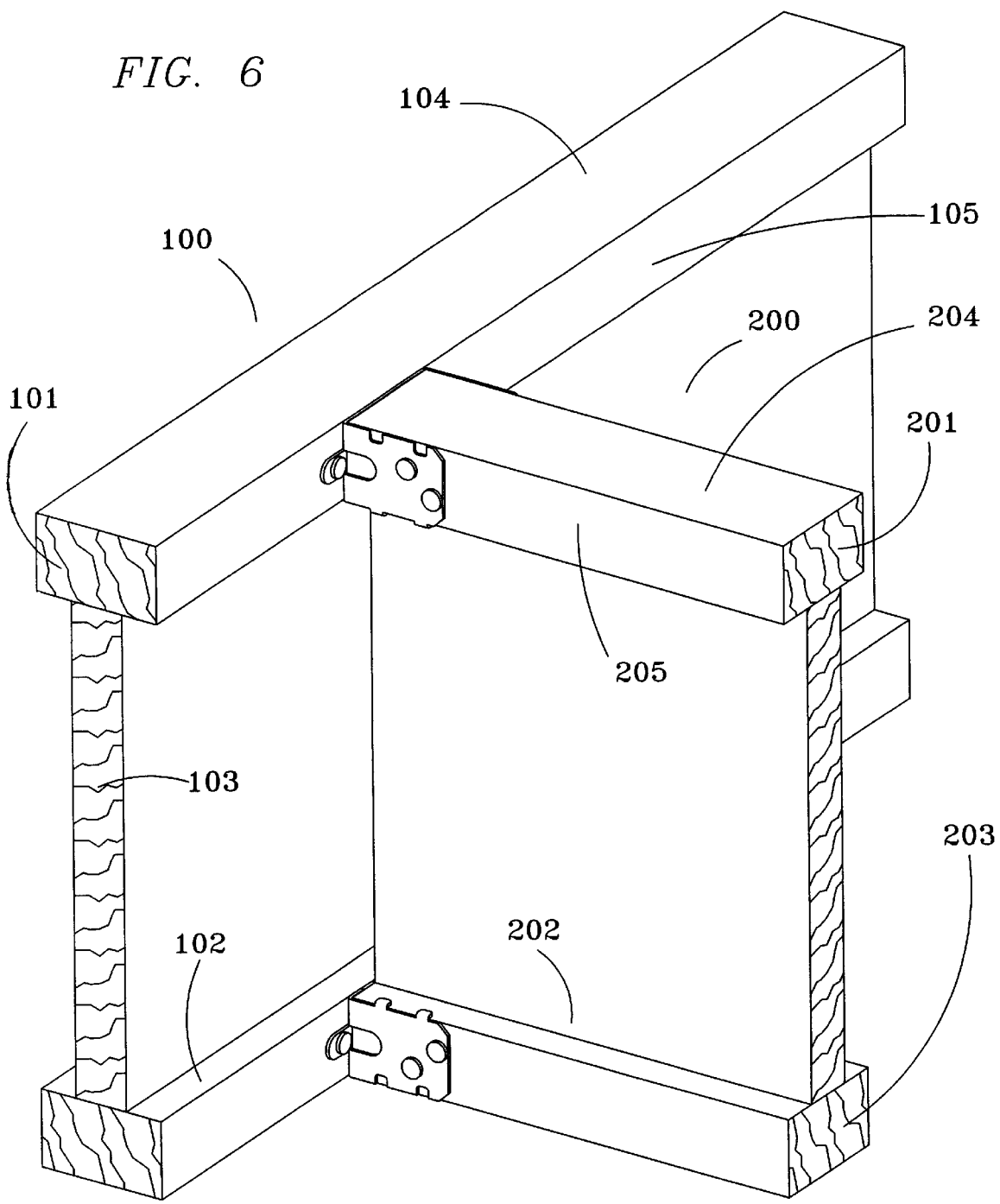
FIG. 6 is an orthographic view of two blocking anchors fastening an engineered bridge to an engineered joist.

As may be understood by examination of FIGS. 6 and 7, four fasteners, such as screws or possibly nails, may be used to fasten the first and second legs to opposed sides of the flange of an engineered bridge or to opposed sides of a dimensional lumber bridge.

Referring particularly to FIGS. 1 and 2, the structure of front and rear tabs 44, 45 extending perpendicularly from each leg may be seen. The utility of the tabs may be seen with reference to FIG. 6, wherein upper and lower blocking anchors are used to attach an engineered bridge to an engineered joist. The tabs extending from the legs of the upper blocking anchor wrap over the upper surface 204 of the upper rail 201 of the engineered bridge 200. The tabs of the lower blocking anchor wrap over the lower surface of the lower rail 202 of the engineered bridge.

Referring to FIG. 7, similar upper and lower blocking anchors are seen attaching a dimensional lumber bridge 400 to a dimensional lumber joist 300. The tabs extending from the legs of the upper blocking anchor wrap over the upper surface 401 of the dimensional lumber bridge. The tabs of the lower blocking anchor wrap over the lower surface of the dimensional lumber bridge.

In a preferred version of the first and second legs, front and rear notches 46, 47 result during the manufacturing process, wherein sheet metal used to form the blocking anchors is stamped to form each blocking anchor. The notches defined in the legs in a first blocking anchor, therefore, correspond to the tabs extending from the legs in a second blocking anchor formed adjacent to the first.

As seen particularly in FIGS. 1 and 2, first and second fastening flanges 60, 70 extend from opposed sides of the base. The fastening flanges allow connection of the blocking anchor 20 to the side surface 105 of a rail 101 or 102 of an engineered joist, or to the side surface 402 of a dimensional lumber bridge 400.

As seen particularly in FIGS. 1 and 2, in a preferred embodiment, the first and second fastening flanges are formed from associated punch-outs 43 defined in the first and second legs 40, 50, respectively.

Each fastening flange defines a hole 61 for passage of a fastener, which allows attachment of the blocking anchor to the side 205 of a flange of an engineered joist, or the side 302 of a dimensional lumber joist 300.

Figure 8:
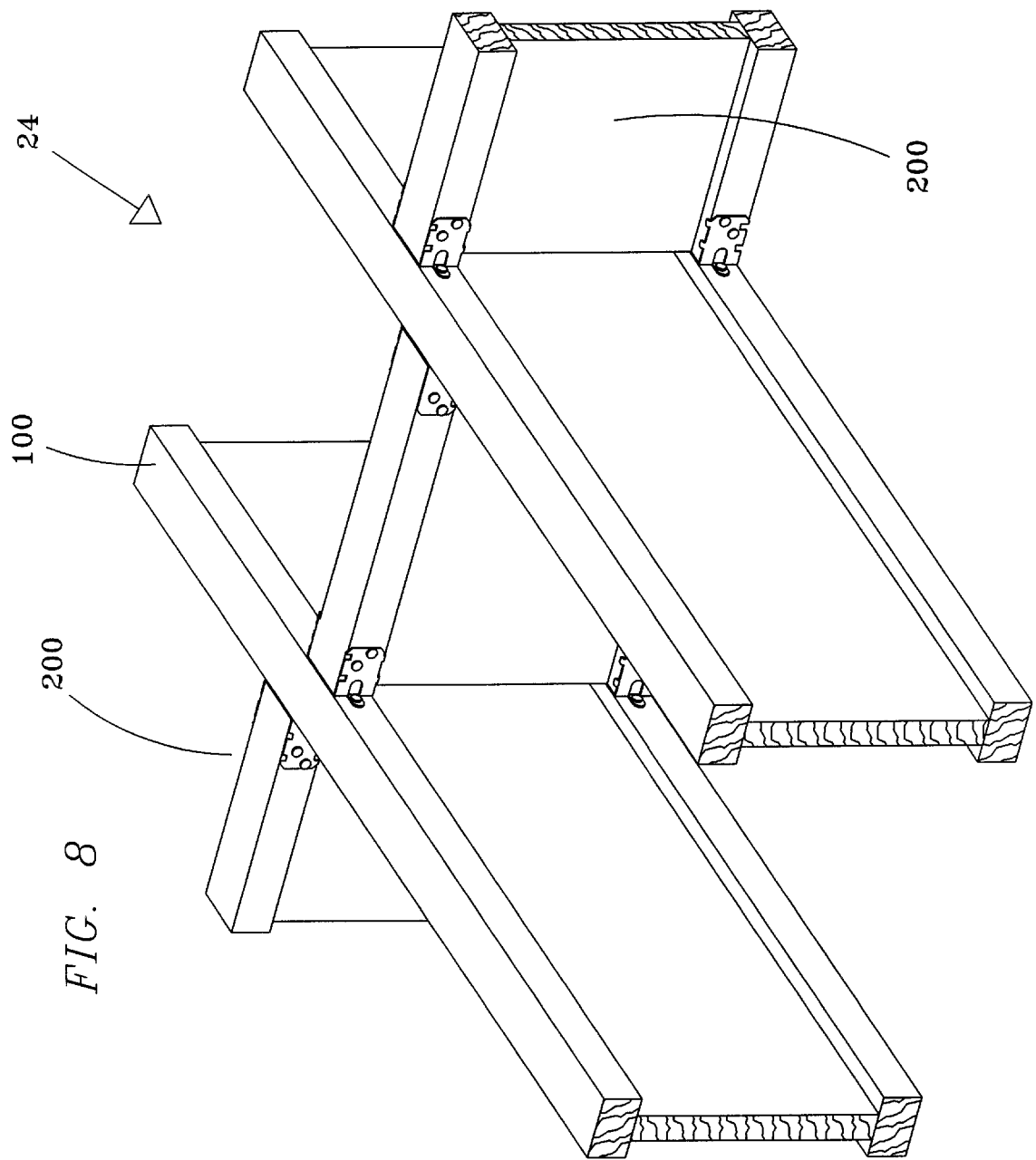
FIG. 8 is an orthographic view of a support matrix, including a plurality of engineered bridges connecting two engineered joists, illustrating the preferred staggered formation used by the bridges.

As seen in the isometric view of FIG. 8, a plurality of bridge elements are staggered between a plurality of joists. By staggering the bridge elements, the fasteners extending from the fastening flanges of blocking anchors on opposite sides of a joist enter the joist in a staggered manner that does not result in conflict between the fasteners associated with the blocking anchors on opposed sides of a joist.

The previously described versions of the present invention have many advantages, including a primary advantage of providing a novel blocking anchor for attachment of a bridge between adjacent floor joists, which provides a better connection between the first and second ends of a bridge and adjacent floor joists, resulting in a better and stronger construction.

Another advantage of the present invention is to provide a novel blocking anchor for attachment of a bridge between adjacent floor joists, which is adapted for use with floor joists made of both engineered wood products and dimensional lumber, and which is adapted for use with bridges made of both engineered wood products and dimensional lumber.

A still further advantage of the present invention is to provide a novel blocking anchor for attachment of a bridge between adjacent floor joists, which is capable of compensating for bridges that are incrementally shorter than the distance between two floor joists.

Although the present invention has been described in considerable detail and with reference to certain preferred versions, other versions are possible. For example, while in a preferred embodiment, left and right fastening flanges are formed by a punch-out in left and right legs, respectively. In an alternative embodiment, the fastening flanges may be defined in an alternative manner, still in keeping with the teachings of the disclosure. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the-means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A blocking anchor for attachment of a bridge between adjacent floor joists, comprising:
   (A) a base, wherein left and right tabs extend perpendicularly from a first edge of the base, and wherein left and right notches are defined in a second edge opposite to the first edge;
   (B) first and second legs extending from opposed sides of the base, each leg defining at least one fastener hole, wherein the fastener holes of the first leg are staggered with respect to at least one fastener holes defined in the second leg; and
   (C) first and second fastening flanges, extending from opposed sides of the base.

2. The blocking anchor of claim 1, wherein the base, first and second legs and first and second fastening flanges are made of sheet metal.

3. The blocking anchor of claim 1, wherein the base, first and second legs and first and second fastening flanges are made of plastic.

4. The blocking anchor of claim 1 wherein front and rear tabs extend perpendicularly from a first edge of each leg, and wherein front and rear notches are defined in a second edge of each leg.

5. A blocking anchor for attachment of a bridge between adjacent floor joists, comprising:
   (A) a base, made of sheet material, having left and right tabs extending perpendicularly from a first edge, and a second edge opposite to the first edge defining left and right notches;
   (B) first and second legs extending from opposed sides of the base, each leg defining two fastener holes, wherein the fastener holes of the first leg are staggered with respect to two fastener holes defined in the second leg, and each leg having front and rear tabs extending perpendicularly from a first edge and front and rear notches defined in a second edge; and
   (C) first and second fastening flanges, extending from opposed sides of the base, wherein the first and second fastening flanges are formed from associated punch-outs defined in the first and second legs, respectively.

6. A support matrix, comprising:
   (A) a plurality of joists, oriented in a parallel configuration; and
   (B) a plurality of bridges, oriented in a staggered configuration, wherein each bridge has first and second ends attached to first and second adjacent joists, and wherein each end of each bridge is attached to an associated joist by upper and lower blocking anchors; and
   (C) wherein each blocking anchor comprising:
      (a) a base;
      (b) first and second legs extending from opposed sides of the base, each leg defining at least one fastener hole, wherein the fastener holes of the first leg are staggered with respect to at least one fastener holes defined in the second leg; and
      (c) first and second fastening flanges, extending from opposed sides of the base.

* * * * *